US011899665B2

(12) United States Patent
Safaie et al.

(10) Patent No.: US 11,899,665 B2
(45) Date of Patent: Feb. 13, 2024

(54) DATA AGGREGATION AND PRE-POSITIONING FOR MULTI-STORE QUERIES

(71) Applicant: Atscale, Inc., San Mateo, CA (US)

(72) Inventors: Rouzbeh Safaie, San Francisco, CA (US); Joseph Barefoot, San Fransico, CA (US); Trystan R. Leftwich, Parramatta (AU)

(73) Assignee: AtScale, Inc., Boston, MA (US)

( * ) Notice: Subject to any disclaimer, the term of this patent is extended or adjusted under 35 U.S.C. 154(b) by 141 days.

(21) Appl. No.: 17/529,890

(22) Filed: Nov. 18, 2021

(65) Prior Publication Data
US 2022/0164354 A1    May 26, 2022

Related U.S. Application Data

(60) Provisional application No. 63/116,378, filed on Nov. 20, 2020.

(51) Int. Cl.
| | |
|---|---|
| *G06F 16/2455* | (2019.01) |
| *G06F 16/2453* | (2019.01) |
| *G06F 16/242* | (2019.01) |
| *G06F 11/34* | (2006.01) |

(52) U.S. Cl.
CPC .... *G06F 16/24552* (2019.01); *G06F 11/3419* (2013.01); *G06F 16/244* (2019.01); *G06F 16/2456* (2019.01); *G06F 16/24544* (2019.01)

(58) Field of Classification Search
CPC .......... G06F 16/24552; G06F 11/3419; G06F 16/244; G06F 16/24544; G06F 16/2456; G06F 11/3409; G06F 2201/80; G06F 2201/845

See application file for complete search history.

(56) References Cited

U.S. PATENT DOCUMENTS

| | | | |
|---|---|---|---|
| 8,812,490 B1 * | 8/2014 | Cappiello | G06F 16/2453 707/718 |
| 10,148,531 B1 * | 12/2018 | Sledz | G06F 16/182 |
| 2003/0200221 A1 * | 10/2003 | Bakalash | G06F 16/283 |
| 2008/0033914 A1 * | 2/2008 | Cherniack | G06F 16/283 |
| 2008/0168058 A1 * | 7/2008 | Gordon | G06F 16/217 707/999.005 |
| 2010/0023504 A1 * | 1/2010 | Baris | G06F 16/2471 707/E17.014 |
| 2011/0246550 A1 * | 10/2011 | Levari | G06F 16/24556 709/201 |
| 2017/0329835 A1 * | 11/2017 | Lee | G06F 9/5083 |
| 2019/0095494 A1 * | 3/2019 | Bhattacharjee | G06F 7/5324 |

* cited by examiner

*Primary Examiner* — Mark D Featherstone
*Assistant Examiner* — Kweku William Halm
(74) *Attorney, Agent, or Firm* — Armis IP Law, LLC

(57) ABSTRACT

A query engine or compute engine receiving a query request identifies a plurality of data sources for satisfying a query request, and determines, from among multiple data sources, one or more fields likely to incur substantial computational demands in processing the query request. Pre-positioning aggregation logic moves the determined fields one data source to another data source for positioning the moved fields to a single data source from which the query result will be computed.

20 Claims, 4 Drawing Sheets

DATA AGGREGATION AND PRE-POSITIONING FOR MULTI-STORE QUERIES

RELATED APPLICATIONS

This patent application claims the benefit under 35 U.S.C. § 119(e) of U.S. Provisional Patent App. No. 63/116,378, filed Nov. 20, 2020, entitled "DATA AGGREGATION AND PRE-POSITIONING FOR MULTI-STORE QUERIES," incorporated herein by reference in entirety.

BACKGROUND

Electronic databases store vast amounts of data, and have been doing so for several decades ever since the cost of computer hardware came within reach for most businesses and consumers. Large "data warehouses" now store vast amounts of data stored and indexed according to a storage format, often according to tables or multidimensional arrangements and indices that allow access to the data though interfaces and software defined by the particular vendor software supporting the particular data warehouse.

SUMMARY

A query engine or compute engine receiving a query request identifies a plurality of data sources for satisfying a query request, and determines, from among multiple data sources, one or more fields likely to incur substantial computational demands in processing the query request. Pre-positioning logic moves the determined fields one data source to another data source for positioning the moved fields to a single data source from which the query result will be computed.

The query engine provides optimizations for the execution of SQL or MDX queries against two or more underlying data stores in a single query against a single virtual schema, by aiming to avoid or reduce the amount of data movement at query runtime by pre-moving data to achieve data locality in a manner transparent to the user. A query processing server for a querying the multidimensional database identifies data sets or dimensions stored across multiple data warehouses, identifies data tables or fields that benefit from querying in a single location, and copies or transforms the identified data items for processing in a single query request. Heuristics, patterns and statistical features are gathered or identified that indicate a high computational overhead, such as repeated fetches or retrievals across different data warehouses, and highly accessed data items are moved to the same location or data warehouse so that the query processing may be performed on a single data warehouse. The approach weighs the overhead of moving and transforming the data to correspond to the destination data warehouse with increased and duplicative retrievals from a native store. Highly accessed or redundant data items are pre-positioned prior to query execution.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein are based, in part, on the observation that many query requests are issued by users without knowledge or need to necessarily know locations, forms and volumes of data. Unfortunately, conventional approaches to query parsing and processing suffer from the shortcoming that certain fields called out in a query request may extend the query to many rows or records in a different data warehouse, impacting a computation burden and performance of generating a query result. Users generally prefer not to be burdened with identifying locations or storage regimes for deconstructing the query into separate queries directed to different data stores/warehouses. Accordingly, configurations herein employ aggregation logic for identifying "burdensome" fields, and moving the determined fields or tables from the data source to another data source for positioning the moved fields to allow the query request processing to proceed on a single data source or warehouse containing the moved data.

Figure 1:
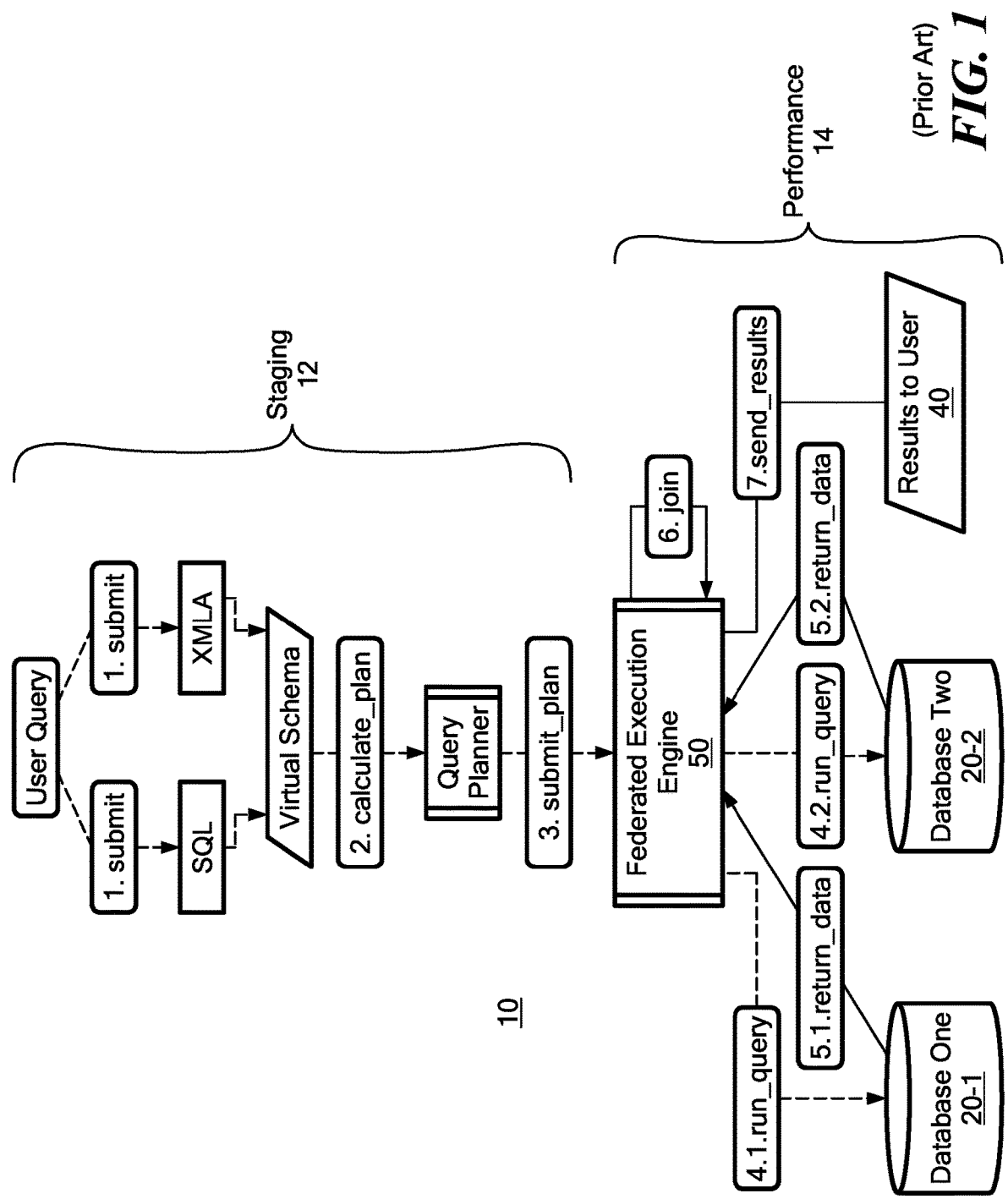
FIG. 1 is a context diagram of a prior art database environment.

In conventional query approaches, a federated execution engine can be used to collect data from multiple datastores, join the data and send the results back to the user, as shown in FIG. 1. FIG. 1 is a context diagram of a prior art database environment including data sources 20-1 and 20-2 (20 generally). The data sources 20 may be any suitable storage medium, file system, cloud (Internet) distributed medium, and is often responsive to a DBMS (database management system) of a particular vendor. Generally, the data sources 20 are not co-located, and need to be brought together in order to perform a query. This often involves a so-called Federated Execution Engine 50, which is a computing device or server capable of accessing all the data sources 20 concerned with satisfying the query. In the federated execution environment 10, satisfaction of the query can be considered in two components: a staging component 12, which receives and identifies the fields or columns and the locations of the data sources 20 containing those fields. A performance component 14 performs the actual movement of data and computation of the result, often involving joins between fields, which represents a substantial portion of the computational resources required to generate a query result.

One of the issues faced with federated execution engines 50 revolves around performance with large datasets in the underlying data stores. All data from the data stores has to be moved to the federated execution engine 50 before it can be joined and result processing can be performed. This fact often makes processing these types of federated queries very costly to run in terms of time and compute power.

For example, referring to a code fragment illustrating an incoming SQL Query:

```
SELECT
    country,
    SUM(sales) AS total_sales
FROM
    sales
```

In this fragment, sales data resides in database_1 and country data resides in database_2.

In conventional approaches, this will resolve in querying data from both database_1 and database_2 at runtime, then joining the data in a third system before returning the results back to the user.

In contrast, configurations herein identify a first data source having a magnitude of data items referenced in the query request, and identify a second data source having a greater magnitude of data items in the query request than the first data source, where magnitude is a measure of a computational burden imposed by the respective fields. The query engine transforms the data items from the first data source to the second data source, and computes the query results based on the second data source. Each of the data sources are typically data warehouses or similar repositories, and each of the one or more fields correspond to a table in the respective data source. Generally, different data warehouses imply a storage form and retrieval based on a particular vendor, such as HADOOP®, BIG QUERY®, ORACLE®, POSTGRES®, MYSQL® and others.

For example, if you have a total of 1 billion sales in the sales table and sales are made in 100 different countries, then in a conventional federated execution path as above, this would cause data on one side of the join to read 1 billion rows of data and stream it into a federated execution engine before joining it to the country table. This incurs an extremely slow process and introduces practical limitations in the types of answers that can be retrieved from multiple datastores.

In contrast, configurations herein employ aggregation logic to pre-emptively move data from database_1 to database_2 before executing the query in order to reduce the amount of data movement required to execute the user query, massively optimizing performance and resources needed to execute user queries.

Configurations herein present a solution such that when a virtual schema is created with more than one underlying datastore, it analyzes statistics of the tables and types of questions that can be answered from the relationships in the virtual schema and decides to automatically move full tables or subsets of tables from one datastore to another to achieve join locality of the data in future user queries, thus avoiding data movement at query runtime. This process continues throughout the lifetime of an active virtual schema. As query usage statistics improve, these statistics can change the decisions made by predictive aggregation logic makes when deciding which data to move between the underlying datastores.

A particular configuration includes the following elements:
  Virtual Cube Schema
  Compute Engine (Federated Execution Engine)
  Pre-Aggregated Prediction logic
  Pre-Aggregated materialization logic A virtual schema of the datastore the end user is running queries against contains the information required to create an execution plan that can get data from multiple underlying datastores from a single inbound query. The virtual schema, often referred to as a datacube, defines a multidimensional form where each field available for a query request defines a different dimension.

The predictive aggregation logic analyzes the information in the virtual schema and decides what data should be moved from one or more underlying data stores to other data stores to facilitate improved runtime query performance. The decision of whether to pre-emptively move data to another datastore is largely based around statistics of the underlying data in tables, at either a full table level or an aggregated view of a table.

As the virtual schema is based in a cube design, the predictive aggregation logic has prior knowledge of columns that can be used in joins. This contributes to the decisions made where we will bias towards pre-moving data that can be used in subsequent joins to other tables in the datastores we are moving data to.

On initial publishing of a schema, statistics are collected around cardinality of join columns and the row size of an underlying table, if a table is considered small then the table is copied to the target datastore where tables exist that this dataset is likely to be joined to.

As the predictive aggregation logic continues to run and statistics are collected on runtime queries, tables that cannot be completely copied to other datastores due to size constraints, are continually analyzed to see if narrowing the number of columns that will be moved to a target datastore will result in a smaller size allowing the table to be below the size constraint. For example:

A product dimension table may contain several columns:

```
product_id (join_column)
product_name
product_description
product_category
```

The initial projection of the size of this table may consider this table too large to copy to another datastore, for example, say there are 5 million products in the table, this leads to 5 million unique product_id's and product_names, however there may only be 100 product_categories.

When moving data between different data warehouses, and hence different vendor prescribed forms, moving and transforming the data further includes retrieving the data items from the first data source according to a storage format of the first data source, and converting the data from the storage format of the first data source to a storage format of the second data source. The converted data items are then written to the second data source.

As runtime query statistics are collected, it may show that users are mostly running queries that are only interested in product_category, of which there are only 100 categories.

The predictive aggregation logic will adapt to pre-aggregate the data it will move to another datastore to achieve join locality by effectively running the following code fragment:

```
SELECT
    product_id,
    product_category
FROM
    products
GROUP BY
    product_id,
    product_category
```

In this way the majority of future queries will be able to execute the join in a single datastore directly rather than copying large amounts of data into the federated execution engine, thus improving query performance.

The predictive aggregation logic may employ a statistical analysis that coordinates the movement of data between underlying data stores by utilizing the compute engine to move the data through the execution of a set of SQL statements that use the federated capabilities of the compute engine.

This algorithm will ingest payloads from the prediction algorithm and execute the actual movement of the data. This is done via a sequence of DDL, or Data Definition Language extension of SQL statements that execute in the federated execution engine that map data from one datastore into another datastore then executes the movement of that data.

The predictive aggregation logic performs several comparisons for assessing the relative magnitude of data item (i.e. table or set) movement between data warehouses. The aggregation logic may compute the magnitude based on a cardinality of the data items.

It may also compute the magnitude based on a number of rows in which the data items are stored. Prior to any history of query activity, the predictive aggregation logic may evaluate the magnitude based on a schema of the data items from the first data source by concluding, from fields in the schema, that the data items are subject to a high frequency of access.

Figure 2:
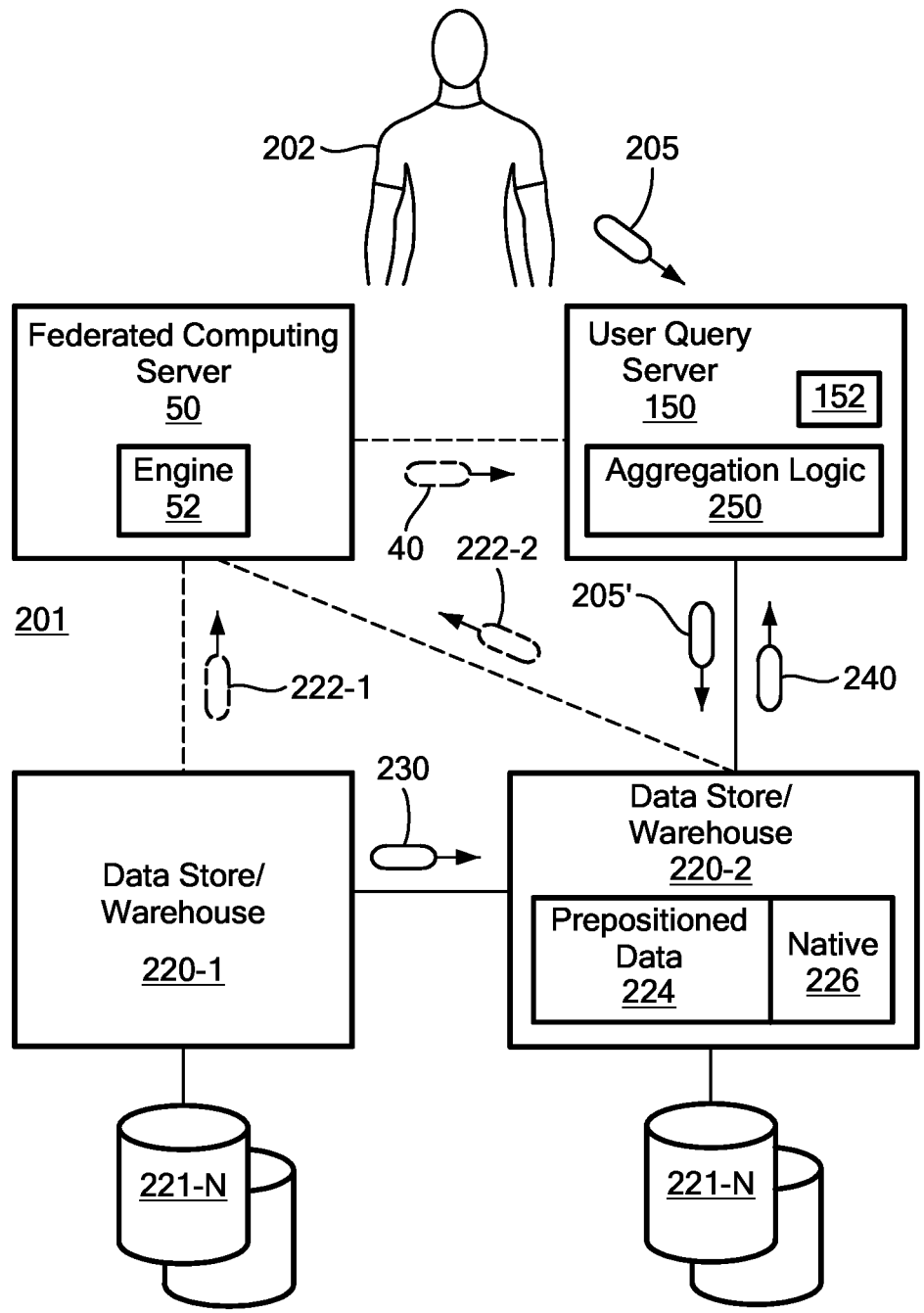
FIG. 2 is a data flow diagram of query processing according to configurations herein.

FIG. 2 is a data flow diagram 200 of query processing according to configurations herein. Referring to FIGS. 1 and 2, in a database environment 201, a plurality of data sources 220-1 . . . 220-2 (220 generally) store queryable data in a number of physical storage volumes 221-N. The data sources may be data warehouses or similar repositories, and are typically responsive to, and/or stored under, a particular DBMS of a vendor. A user 202 issues a query request 205, typically from a user interface of a user device, however any suitable user query interface may be invoked. A user query server 150 receives the query request 205. The user query server may be any suitable computing resources for satisfying the staging 12 of the query processing. Predictive aggregation logic 250 identifies a plurality of data sources 220 for satisfying the query request, 205. Each query request 205 includes a plurality of fields and conditional statements describing the fields and records for retrieval. A multidimensional data source as employed herein defines fields as a dimension in a multidimensional structure, or datacube. The actual data fields are ultimately stored in a table arrangement including columns, defining the fields, and rows, or records, which include other related fields. The datacube, along with related indices and logical views, abstracts the physical tables for allowing robust queries, however ultimately implements the query by performing joins between a number of tables for satisfying the query request 205. Each of the one or more fields in the query request correspond to a table in the respective data source.

The predictive aggregation logic 250 determines, for at least one of the data sources, one or more fields likely to incur substantial computational demands due to processing the query request 205, and moves the determined fields from one data source to another data source for positioning the moved fields to the other data source 220 of the plurality of data sources 220-N. Based on the query request 205, the user query server 150 identifies a first data source 220-1 having a magnitude of data items referenced in the query request 205, and identifies a second data source having a greater magnitude of data items in the query request than the first data source.

One of the robust features of the user query server and included query logic 152 is an ability to reference tables in from different data sources 220. As indicated above, conventional approaches would simply copy all the concerned fields, and also the corresponding records, to the federated server 50 common to both data sources, shown as transfers 222-1 and 222-2. A query engine 52 at the federated server 50 expends the computing resources on the now combined data, and returns a federated query result 40 to the user. This involves substantial resources to copy all the queried data to the federated server 50.

In the claimed approach, in contrast, the predictive aggregation logic 250 transforms the data items from the first data source 220-1 to the second data source 220-2 in a message 230 or file transfer via a suitable network interface, and computes the query results based on the second data source 220-2. Since all the necessary fields and tables are aggregated at the second data source 220 by the message 230, processing capabilities either located at the data source 220 or the query server 150 compute the query results 240. Only the portion of non-native data in the message 230 needs to be transferred. When the non-native portion is only a relatively small portion of the data to be queried, the performance improvement is substantial over a complete duplication of all queried data in transfers 222-1 and 222-2. Utilization of the prepositioned data to generate a query result therefore improves performance by mitigating network traffic in transporting additional fields or rows of fields to a processing device.

In the example configuration, the prepositioning message 230 may be performed by DDL. This syntax facilitates the definition of metadata such as schemas for the tables and columns thereof that will be pre-positioned, or copied. The predictive aggregation logic 250 implements a pre-aggregated materialization algorithm that receives statistics on query activity based on fields (columns) and activity of joins between fields, and identifies fields likely to be sought in a join, and/or for retrieval based on a join. When one particular data source 220 contains the majority of queried data, this native source 226 remains the preferred location for the query to occur. Accordingly, the minority fields or tables transferred in the message 230 are stored as prepositioned data 224, and are available for query similar to the native fields 226 following transfer or copy.

Figure 3:
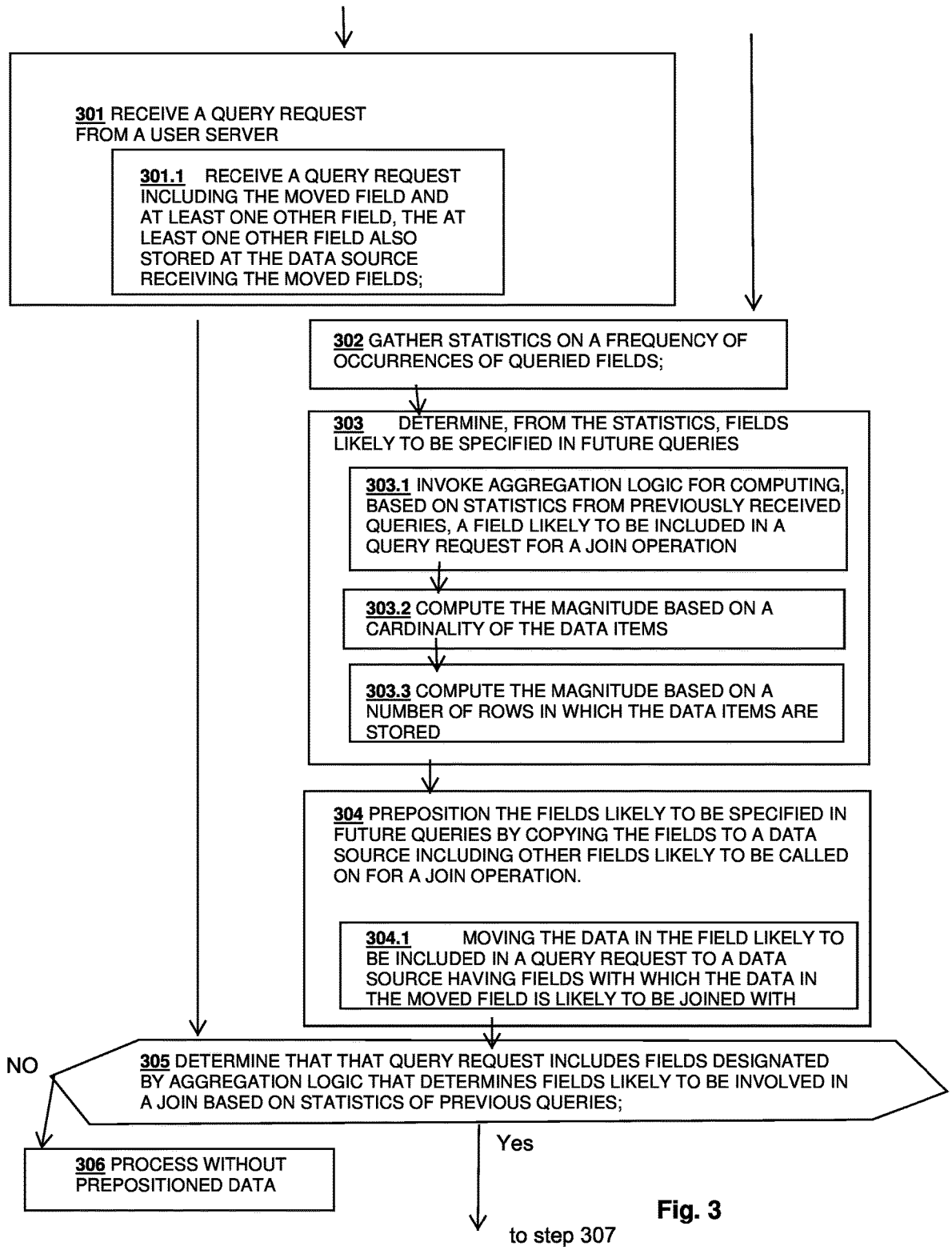
FIG. 3 is a flowchart of query processing using pre-positioned data as in FIG. 2.
Figure 3:
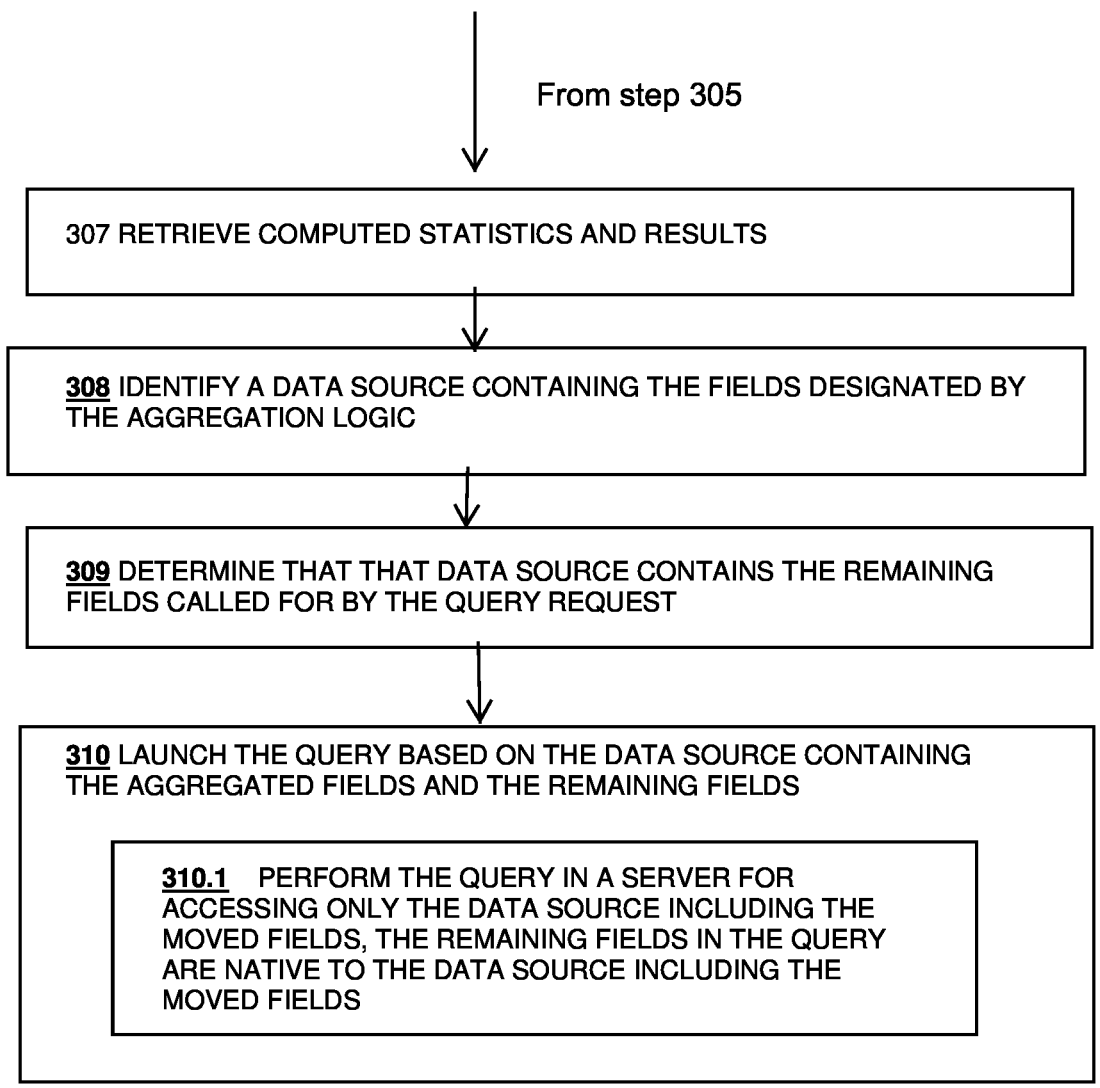

FIG. 3 is a flowchart of query processing using prepositioned data as in FIG. 2. Referring to FIGS. 1-3, the method of pre-positioning data prior to query execution as disclosed herein includes, at step 301, receiving the query request 205 at the user query server 150. The query request may also be passed along 205' to the data source 220 or warehouse, depending on the computational resource performing the joins of the query, but it need not involve a copy or transfer of all queried data to a federated server 50.

Concurrently, the predictive aggregation logic 250 gathers statistics on a frequency of occurrences of queried fields, based on previous queries, as depicted at step 302.

The predictive aggregation logic 250 determines, from the statistics, fields likely to be specified in future queries, as shown at step 303. This includes invoking the aggregation logic 250 for computing, based on statistics from previously received queries, a field likely to be included in a query request for a join operation, as depicted at step 303.1. Among other indicators, the predictive aggregation logic 250 may compute the magnitude of queried data based on a cardinality of the data items, at step 303.1 or based on a number of rows in which the data items are stored, shown at step 303.2 The magnitude is a measure of computing and network resources invoked in sending the prepositioning message 230. It should be apparent that the smaller magnitude of data would be brought to the larger data volume (defining the greater magnitude).

In the example above, the predictive aggregation logic may compute the magnitude based on a schema of the data items from the first data source 220-1 by concluding, from fields in the schema, that the data items are subject to a high frequency of access, as depicted at step 303.3

Based on the predictive aggregation logic 250, the user query server 150 directs prepositioning of the fields likely to be specified in future queries by copying the fields to a data source including other fields likely to be called on for a join operation, as depicted at step 304. Accordingly, in the example configuration of FIG. 2, this involves receiving a query request including the moved field and at least one other field, where the other field also stored at the data source receiving the moved fields. In other words, at least one field from the remote data source is prepositioned as the prepositioned data 224, in anticipation of a query involving at least one field of native data 222. This performs the actual moving of the data for the field or fields likely to be included in a query request to a data source 220 having fields with which the data in the moved field is likely to be joined with, as depicted at step 304.1. In general, the fields involved in the join are also associated with other fields in the same record (row) of the constituent table; these fields may be moved as well as they are often involved in reporting the query result. The predictive aggregation logic 250 also determines this based on fields called on for reporting (i.e. in a SELECT statement), in addition to those fields called on for a join operation (in a conditional WHERE or JOIN statement).

In certain configurations, data called upon by the user query 205 exists in a different form or type in the source where it is moved from. Accordingly, the predictive aggregation logic 250 also identifies schema values of the types of the queried data used for prepositioning. In such an instance, transforming the data via the prepositioning message 230 further includes retrieving the data items from the first data source 220-1 according to a storage format of the first data source, and converting the data from the storage format of the first data source to a storage format of the second data source 220-2. The converted data items are then written to the second data source 220-1 according to the form or type called for by the prepositioning logic.

The prepositioning aggregation logic 250 seeks to improve performance when it is beneficial to incur the cost of copying a relatively small amount of data to a location having a relatively larger magnitude of the data needed for the query. It may be preferable to establish a threshold indicative of a maximum limit of data to be transferred according to the predictive aggregation logic, to avoid incurring a transfer of data that exhibits diminishing returns in overall performance. The threshold may identify a maximum number of rows included in the determined fields likely to be specified in future queries, or optionally a size and number of individual fields. This threshold would restrict the number of rows included in the data for prepositioning, based on a storage requirement of the determined fields likely to be specified in future queries, if such a transfer exceeds the identified maximum number of rows or overall volume of data.

Reviewing the current occurrences in the environment 201, data has been prepositioned in the prepositioning store 224 in anticipation of future queries, and a user request 205 is pending processing to generate a query result 240. A check is performed, at step 305, to determine if the query request 205 includes fields designated by the predictive aggregation logic 250 that determines fields likely to be involved in a join based on statistics of previous queries. If fields are not prepositioned, then query processing proceeds without a benefit of prepositioned data, as depicted at step 306.

Otherwise, the user query server 150 retrieves computed statistics and results of available prepositioned data 224, as shown at step 307, and identifies the data source (220-2, in this case) containing the fields designated by the prepositioning aggregation logic 250, as depicted at step 308. The user query server 150 determines that that data source contains the remaining fields called for by the query request, as depicted at step 309, and the query request 205 is executed based on the data source 220-2 containing the aggregated, prepositioned fields 224 and the remaining, native 226 fields. Multiple data sources 220 may send a transfer message 230 to provide a full complement of fields (tables) called for by the query at a single data source. Similarly, the actual query to be performed at the behest of the user query server 150 may be performed at any suitable computing device, such as at, or appurtenant to, the aggregated data source 220-2. The prepositioning aggregation logic 250 ensures performance of the query request in a server for accessing only the data source including the moved fields in the prepositioned data, such that the remaining fields in the query are native to the data source including the moved fields. Stated differently, all fields needed for the query request 205 are stored in either the prepositioned data 224 or part of the native data 226 at the data source 220-2 selected for the query.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of pre-positioning data prior to query execution, comprising:
   identifying a plurality of data sources for satisfying a query request, the query request including a plurality of fields;
   determining, for at least one data source of the plurality of data sources, one or more burdensome fields of the plurality of fields likely to incur substantial computational demands due to processing the query request; and
   moving the burdensome fields from a first data source to a second data source for positioning the burdensome fields at the second data source of the plurality of data sources for reducing the computational burden, the first data source having different fields than the second data source.

2. The method of claim 1 wherein each data source of the plurality of data sources are data warehouses, and each of the one or more fields correspond to a table in a respective data source.

3. The method of claim 1 further comprising:
   identifying a first data source having a magnitude of data items referenced in the query request;
   identifying a second data source having a greater magnitude of data items in the query request than the first data source;
   transforming the data items from the first data source to the second data source; and
   computing a query result based on the second data source.

4. The method of claim 3 further comprising computing the magnitude based on a cardinality of the data items.

5. The method of claim 3 further comprising computing the magnitude based on a number of rows in which the data items are stored.

6. The method of claim 3 further comprising computing the magnitude based on a schema of the data items from the first data source by concluding, from fields in the schema, that the data items are subject to a high frequency of access.

7. The method of claim 3 wherein transforming further comprises:
   retrieving the data items from the first data source according to a storage format of the first data source;
   converting the data from the storage format of the first data source to a storage format of the second data source; and
   writing the converted data items to the second data source.

8. The method of claim 1 further comprising:
   gathering statistics on a frequency of occurrences of queried fields;
   determining, from the statistics, fields likely to be specified in future queries; and
   prepositioning one or more fields likely to be specified in future queries by copying the one or more fields to a data source including other fields likely to be called on for a join operation.

9. The method of claim 1 further comprising:
   receiving the query request from a user server;
   determining that the query request includes fields designated by aggregation logic that determines fields likely to be involved in a join based on statistics of previous queries;
   identifying a data source containing the fields designated by the aggregation logic;
   determining that the data source contains the remaining fields called for by the query request; and
   executing the query based on the data source containing the aggregated fields and the remaining fields.

10. The method of claim 1 further comprising:
    invoking aggregation logic for computing, based on statistics from previously received queries, a field likely to be included in a query request for a join operation;
    moving the data in the burdensome field, the burdensome field likely to be included in a subsequent query request to a data source having fields with which the data in the burdensome field is likely to be joined with;
    receiving a query request including the burdensome field and at least one other field, the at least one other field also stored at the data source receiving the burdensome field; and
    performing the query request in a server for accessing only the data source including the burdensome fields, where fields remaining in the query are native to the data source receiving the moved fields.

11. The method of claim 8 further comprising:
    establishing a threshold indicative of a maximum limit of data to be transferred according to aggregation logic;
    identifying a maximum number of rows included in the determined fields likely to be specified in future queries; and
    restricting a number of rows included in the data for preposition based on a storage requirement of the determined fields likely to be specified in future queries exceeding the identified maximum number of rows.

12. A computing device for pre-positioning data prior to query execution, comprising:
    a user interface for receiving a query request;
    query logic for identifying a plurality of data sources for satisfying the query request, the query request including a plurality of fields;
    aggregation logic for determining, for at least one data source of the plurality of data sources, one or more burdensome fields of the plurality of fields likely to incur substantial computational demands due to processing the query request; and
    a network connection for moving the burdensome fields from a first data source to a second data source for positioning the burdensome fields at the second data source of the plurality of data sources for reducing the computational burden, the first data source having different fields than the second data source.

13. The device of claim 12 wherein each data source of the plurality of data sources are data warehouses, and each of the plurality of fields correspond to a table in the respective data source.

14. The device of claim 12 wherein the aggregation logic is further configured to:
    identify a first data source having a magnitude of data items referenced in the query request;
    identify a second data source having a greater magnitude of data items in the query request than the first data source;
    transform the data items from the first data source to the second data source; and
    the query logic is configured for computing a query result based on the second data source.

15. The device of claim 14 wherein the aggregation logic is further configured for computing the magnitude of data items based on a schema of the data items from the first data source by concluding, from fields in the schema, that the data items are subject to a high frequency of access.

16. The device of claim 12 wherein the aggregation logic is configured to:
gather statistics, the statistics based on a frequency of occurrences of queried fields;
determine, from the statistics, fields likely to be specified in future queries; and
preposition, by copying over a network path, fields likely to be specified in future queries by copying the fields likely to be specified in future queries to a data source including other fields likely to be called on for a join operation.

17. The device of claim 12 wherein the query logic is configured to:
determine that that query request includes fields designated by aggregation logic that determines fields likely to be involved in a join based on statistics of previous queries;
identify a data source containing the fields designated by the aggregation logic;
determine that that data source contains remaining fields called for by the query request; and
executing the query request based on the data source containing the fields designated by the aggregation logic and the remaining fields.

18. The device of claim 12 wherein the query server is configured to:
invoke aggregation logic for computing, based on statistics from previously received queries, a field likely to be included in a query request for a join operation;
move the data in the burdensome field, the burdensome filed likely to be included in a subsequent query request to a data source having fields with which the data in the burdensome field is likely to be joined with;
receive a query request including the burdensome field and at least one other field, the at least one other field also stored at the data source receiving the burdensome field;
direct the query logic to perform the query request in a server for accessing only the data source including the burdensome field, where fields remaining in the query are native to the data source receiving the moved fields.

19. The device of claim 16 wherein the query logic is further configured to:
establish a threshold indicative of a maximum limit of data to be transferred according to predictive aggregation logic;
identify a maximum number of rows included in the determined fields likely to be specified in future queries; and
restrict a number of rows included in the data for prepositioning based on a storage requirement of the determined fields likely to be specified in future queries exceeding the identified maximum number of rows.

20. A computer program embodying program code on a non-transitory medium that, when executed by a processor, performs steps for implementing a method of pre-positioning data prior to query execution, the method comprising:
identifying a plurality of data sources for satisfying a query request, the query request including a plurality of fields;
determining, for at least one data source of the plurality of data sources, one or more burdensome fields of the plurality of fields likely to incur substantial computational demands due to processing the query request; and
moving the burdensome fields from a first data source to a second data source for positioning the burdensome fields at the second data source of the plurality of data sources for reducing the computational burden, the first data source having different fields than the second data source.

* * * * *